US012483885B2

(12) United States Patent
Shawish et al.

(10) Patent No.: US 12,483,885 B2
(45) Date of Patent: Nov. 25, 2025

(54) METHODS, MEDIUMS, AND SYSTEMS FOR ACCESSING ANALYTICAL CHEMISTRY SYSTEMS

(71) Applicant: Waters Technologies Ireland Limited, Dublin (IE)

(72) Inventors: Fadi Shawish, Pawtucket, RI (US); Richard S. Threlfall, Westborough, MA (US); Stephen Payne, Franklin, MA (US)

(73) Assignee: Waters Technologies Ireland Limited, Dublin (IE)

( * ) Notice: Subject to any disclaimer, the term of this patent is extended or adjusted under 35 U.S.C. 154(b) by 309 days.

(21) Appl. No.: 18/052,311

(22) Filed: Nov. 3, 2022

(65) Prior Publication Data

US 2023/0209341 A1     Jun. 29, 2023

Related U.S. Application Data

(60) Provisional application No. 63/275,601, filed on Nov. 4, 2021.

(51) Int. Cl.
*H04W 12/06*     (2021.01)
*H04W 4/80*      (2018.01)

(52) U.S. Cl.
CPC ............ *H04W 12/06* (2013.01); *H04W 4/80* (2018.02)

(58) Field of Classification Search
CPC ... H04W 12/06; H04W 4/80; H04W 36/0011; H04W 80/10; H04L 9/40; H04L 63/0807; H04L 63/083; H04L 63/101; H04L 63/0492; G06F 21/1078
USPC .......................................................... 726/7
See application file for complete search history.

(56) References Cited

U.S. PATENT DOCUMENTS

| 10,382,426 | B2 * | 8/2019 | Falodiya ............. H04L 63/0815 |
| 10,459,752 | B2 | 10/2019 | Larsson |
| 11,240,224 | B2 * | 2/2022 | McCullough, IV .. H04L 63/083 |
| 11,950,101 | B2 * | 4/2024 | Villanueva Gaviola ..................... H04W 12/02 |

(Continued)

OTHER PUBLICATIONS

International Search Report and Written Opinion for International Patent Application No. PCT/IB2022/060609, mailed Mar. 1, 2023.

(Continued)

*Primary Examiner* — Sargon N Nano
(74) *Attorney, Agent, or Firm* — Goodwin Procter LLP

(57) ABSTRACT

Exemplary embodiments provides computer-implemented methods, mediums, and apparatuses configured to perform a secure log in and log out of an analytical chemistry system. In one embodiment, a kiosk associated with the analytical chemistry system may receive a request for access on behalf of a user. The analytical chemistry system may be associated with an audit record storing information about an analytical workflow for processing a sample. The user may obtain a security token by logging into a credentialing application. Upon successfully logging in the user's device may be provided with the security token, which may then be exchanged between the kiosk and a mobile device associated with the user. The security token may be validated, and the user may be permitted access to the analytical chemistry system. The audit record may be updated to include a login action that includes an identity of the user.

20 Claims, 9 Drawing Sheets

(56) References Cited

U.S. PATENT DOCUMENTS

| | | | | |
|---|---|---|---|---|
| 2002/0194499 | A1* | 12/2002 | Audebert | H04L 63/0853 |
| | | | | 726/35 |
| 2005/0136964 | A1* | 6/2005 | Le Saint | G06F 21/34 |
| | | | | 713/155 |
| 2011/0166890 | A1* | 7/2011 | Menschik | G06F 16/68 |
| | | | | 705/3 |
| 2011/0295517 | A1* | 12/2011 | Otvos | G01R 33/307 |
| | | | | 324/309 |
| 2012/0088512 | A1* | 4/2012 | Yamada | H04L 1/0026 |
| | | | | 455/450 |
| 2012/0232367 | A1* | 9/2012 | Allegri | G16H 40/20 |
| | | | | 600/365 |
| 2013/0268687 | A1* | 10/2013 | Schrecker | H04W 12/06 |
| | | | | 709/229 |
| 2013/0268767 | A1* | 10/2013 | Schrecker | G06F 21/31 |
| | | | | 713/185 |
| 2015/0331946 | A1* | 11/2015 | Balwani | G06F 16/25 |
| | | | | 707/769 |
| 2016/0104140 | A1* | 4/2016 | Harrow | G06Q 20/322 |
| | | | | 705/42 |
| 2020/0112557 | A1* | 4/2020 | McCullough, IV | H04L 9/50 |
| 2020/0234277 | A1* | 7/2020 | Dabney | G06Q 20/3276 |
| 2021/0192610 | A1* | 6/2021 | Bowie | G06Q 20/227 |

OTHER PUBLICATIONS

International Preliminary Report on Patentability for International Patent Application No. PCT/IB2022/060609, mailed May 16, 2024.

\* cited by examiner

METHODS, MEDIUMS, AND SYSTEMS FOR ACCESSING ANALYTICAL CHEMISTRY SYSTEMS

CROSS-REFERENCE TO RELATED APPLICATIONS

This application claims the benefit of and priority to U.S. Provisional Patent Application No. 63/275,601, filed Nov. 4, 2021. The entire disclosure of which is hereby incorporated by reference.

BACKGROUND

Laboratory analytical instruments are devices for qualitatively and/or quantitatively analyzing samples. They are often used in a laboratory setting for scientific research or testing. Such devices may measure the chemical makeup of a sample, the quantity of components in a sample, and perform similar analyses. Examples include mass spectrometers, chromatographs, titrators, spectrometers, elemental analyzers, particle size analyzers, rheometers, thermal analyzers, etc.

Laboratory analytical instruments are often used in highly regulated industries, such as pharmaceutical research and development, evidence testing, etc. Moreover, laboratories often adopt best practices based on accepted scientific standards. In order to ensure that a laboratory is complying with regulations and best practices, it becomes necessary to track interactions with the laboratory analytical instrument and the data generated by it. This requires robust authorization, authentication, and auditing protocols.

BRIEF SUMMARY

Exemplary embodiments relate to computer-implemented methods, as well as non-transitory computer-readable mediums storing instructions for performing the methods, apparatuses configured to perform the methods, etc.

In one embodiment, a user may attempt to access an analytical chemistry system using a mobile device and kiosk associated with the analytical chemistry system. The analytical chemistry system may include an instrument configured to perform one or more of liquid chromatography or mass spectrometry, where the analytical chemistry system is associated with an audit record storing information about an analytical workflow for processing a sample by the analytical chemistry system. The analytical chemistry system may include one or more laboratory analytical instruments. Optionally, the system may also include one or more analysis devices for analyzing data from the laboratory analytical instruments.

The user may log into a credentialing application on the mobile device (such as an application from an entity that controls the analytical chemistry system or a third party responsible for handling credentialing). For instance, the user may enter a login identifier and password to log into the credentialing application.

In response to the user logging into the credentialing application, the user's mobile device may be provided with a security token. The security token may be generated by the credentialing application, or may be provided by an authentication server. The security token may be a data structure that validates the user's authority to access the analytical chemistry system. The security token may be encrypted and/or stored in a secure location on the mobile device.

The kiosk associated with an analytical chemistry system may receive a request to access the analytical chemistry system on behalf of the user. The user may provide the security token to the kiosk by exchanging the security token between the kiosk and the mobile device via a suitable short-range communication. For example, the security token may be transmitted to the kiosk using the Near Field Communication (NFC) protocol, BLUETOOTH® protocol, etc. In some embodiments, the security token may be rendered as a visual code, such as a QR code or barcode. The visual code may be read by the kiosk using an image sensor such as a camera.

The security token may be validated by the kiosk, and the user may be permitted access to the analytical chemistry system based on the validating. The audit record may be updated to include a login action that includes an identity of the user.

In another embodiment, the audit record may be a record in an audit trail that complies with a regulatory or scientific standard.

In another embodiment, the credentialing application may prompt for the user's login credentials and may include receiving a user name and password from the user. The user name and password may be authenticated with an authentication server, and the security token may be provided in response to authenticating the user name and password.

In another embodiment, a request to log out of the analytical chemistry system may be received. The user may be prompted for their login credentials, and a second security token may be exchanged with the mobile device. The user may be logged out of the analytical chemistry system, and the audit record may be updated to include a logout action that includes the identity of the user.

Unless otherwise noted, it is contemplated that each embodiment may be used separately to achieve the advantages specifically identified above. It is also contemplated that the embodiments described above (and elsewhere herein) may be used in any combination to achieve further synergistic effects. Other technical features will be readily apparent to one skilled in the art from the following figures, descriptions, and claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
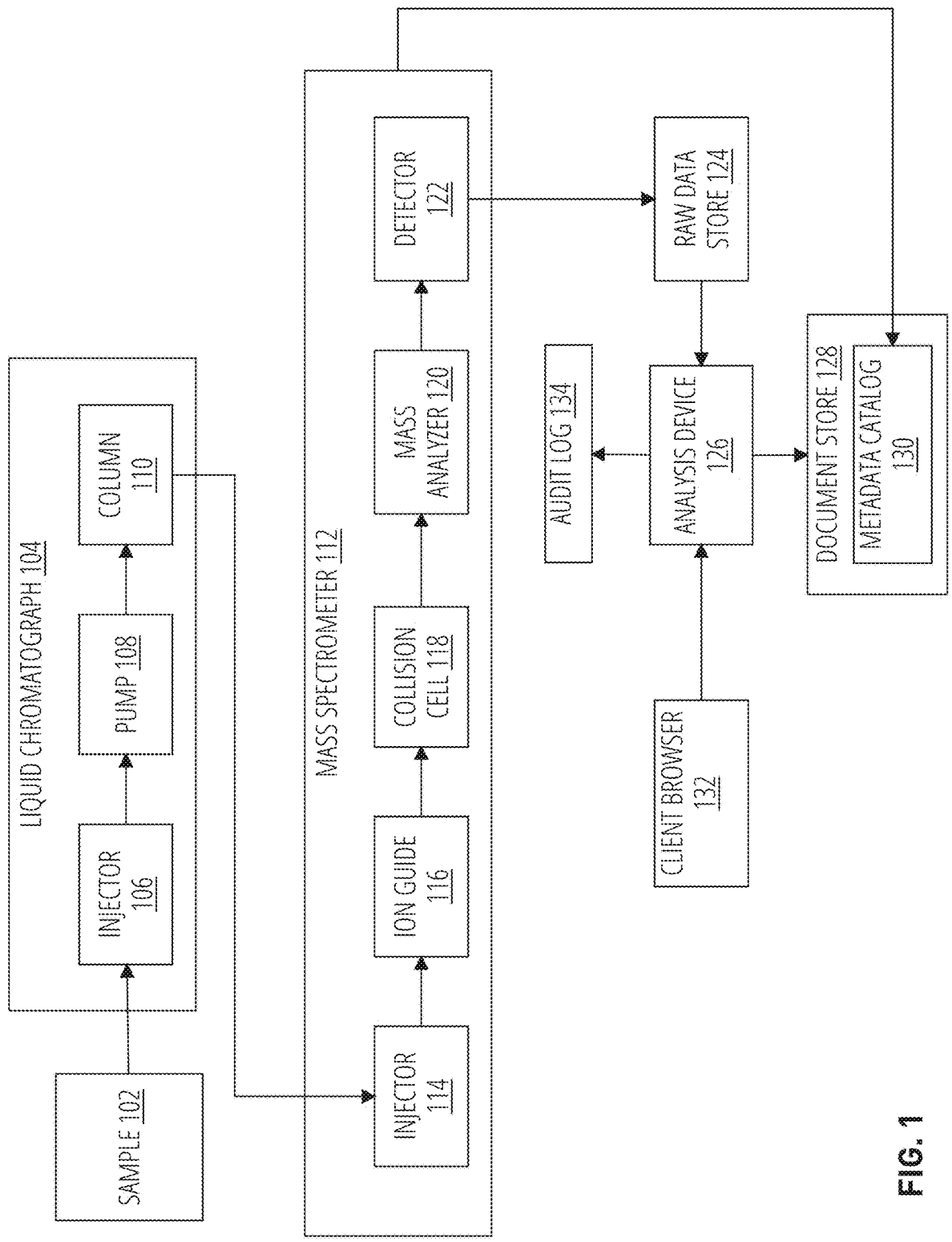
FIG. 1 illustrates an example of a mass spectrometry system according to an exemplary embodiment.

For purposes of auditing, it is important to know not only when a user logged into a system, but specifically which user did so and what changes they made. Moreover, the process for accessing the system should be secure so that unauthorized users are not permitted access.

Exemplary embodiments address these issues by logging users into the system using a security token transmitted via the user's mobile device. The security token may be transmitted via a short-range wireless communications protocol, such as the near field communication (NFC) protocol, or may be a visual code (such as a barcode or QR code) scanned using a camera or similar device on the kiosk. The user can log out of the device using a similar sequence of events.

Accordingly, a user's mobile device will need to be brought in relatively close proximity to a login device (e.g., a kiosk) in order to lo the user in. Because most users have their mobile devices in their possession at most times, receiving the security token from the mobile device provides one way to be reasonably sure that the authenticating user was physically present to log in to the system. In some cases, a user might not even need to remove their device from their pocket if the short-range communication happens automatically. Thus, the user experience can be seamless, with the user simply walking up to a kiosk and starting to use the system. It also means that a user does not need to keep track of a separate login credential, such as an ID badge (which can be lost more easily than the user's mobile device, creating a security problem).

In some embodiments, the security token may be generated by an application that the user must log into (e.g., using biometrics or a user name and password). This provides additional security, since an unauthorized user cannot log in simply by acquiring the user's mobile device. Instead, a person who wishes to log in must be in physical possession of the user's mobile device and be able to log into the application with the user's password or biometric credentials.

Logging into and out of the system using these techniques may cause an audit record for the system to be automatically created and stored. In this way, the login procedure facilitates compliance with regulatory or scientific requirements. For instance, some audit procedures require that a user sign a set of data or an analysis when they are finished with it; this allows the data or analysis to be handed off to the next person in a chain of authority. In some situations, it may not be immediately clear who has authority over the data. Creating automatic audit records as part of the login/logout process makes it easier to track who has edited the data and when.

As an aid to understanding, a series of examples will first be presented before detailed descriptions of the underlying implementations are described. It is noted that these examples are intended to be illustrative only and that the present invention is not limited to the embodiments shown.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-$a$ may include components 122-1, 122-2, 122-3, 122-4, and 122-5. The embodiments are not limited in this context.

These and other features will be described in more detail below with reference to the accompanying figures.

For purposes of illustration, FIG. 1 is a schematic diagram of an analytic chemistry system that may be used in connection with techniques herein. Although FIG. 1 depicts particular types of devices in a specific liquid chromatography/mass spectrometry (LCMS) configuration, one of ordinary skill in the art will understand that different types of chromatographic devices (e.g., MS, tandem MS, etc.) may also be used in connection with the present disclosure.

A sample 102 is injected into a liquid chromatograph 104 through an injector 106. A pump 108 pumps the sample through a column 110 to separate the mixture into component parts according to retention time through the column.

The output from the column is input to a mass spectrometer 112 for analysis. Initially, the sample is desolved and ionized by a desolvation/ionization device 114. Desolvation can be any technique for desolvation, including, for example, a heater, a gas, a heater in combination with a gas or other desolvation technique. Ionization can be by any ionization techniques, including for example, electrospray ionization (ESI), atmospheric pressure chemical ionization (APCI), matrix assisted laser desorption (MALDI) or other ionization technique. Ions resulting from the ionization are fed to a collision cell 118 by a voltage gradient being applied to an ion guide 116. Collision cell 118 can be used to pass the ions (low-energy) or to fragment the ions (high-energy).

Different techniques may be used in which an alternating voltage can be applied across the collision cell 118 to cause fragmentation. Spectra are collected for the precursors at low-energy (no collisions) and fragments at high-energy (results of collisions).

The output of collision cell 118 is input to a mass analyzer 120. Mass analyzer 120 can be any mass analyzer, including quadrupole, time-of-flight (TOF), ion trap, magnetic sector mass analyzers as well as combinations thereof. A detector 122 detects ions emanating from mass analyzer 122. Detector 122 can be integral with mass analyzer 120. For example, in the case of a TOF mass analyzer, detector 122 can be a microchannel plate detector that counts intensity of ions, i.e., counts numbers of ions impinging it.

A raw data store 124 may provide permanent storage for storing the ion counts for analysis. For example, raw data store 124 can be an internal or external computer data storage device such as a disk, flash-based storage, and the like. An analysis device 126 analyzes the stored data. Data can also be analyzed in real time without requiring storage in a storage medium 124. In real time analysis, detector 122 passes data to be analyzed directly to analysis device 126 without first storing it to permanent storage.

Collision cell 118 performs fragmentation of the precursor ions. Fragmentation can be used to determine the primary sequence of a peptide and subsequently lead to the identity of the originating protein. Collision cell 118 includes a gas such as helium, argon, nitrogen, air, or methane. When a charged precursor interacts with gas atoms, the resulting collisions can fragment the precursor by breaking it up into resulting fragment ions. Such fragmentation can be accomplished by switching the voltage in a collision cell between a low voltage state (e.g., low energy, <5 V) and a high voltage state (e.g., high or elevated energy, >15V). High and low voltage may be referred to as high and low energy, since a high or low voltage respectively is used to impart kinetic energy to an ion.

Various protocols can be used to determine when and how to switch the voltage for such an MS/MS acquisition. After data acquisition, the resulting spectra can be extracted from the raw data store 124 and displayed and processed by post-acquisition algorithms in the analysis device 126.

Metadata describing various parameters related to data acquisition may be generated alongside the raw data. This information may include a configuration of the liquid chromatograph 104 or mass spectrometer 112 (or other chromatography apparatus that acquires the data), which may define a data type. An identifier (e.g., a key) for a codec that is configured to decode the data may also be stored as part of the metadata and/or with the raw data. The metadata may be stored in a metadata catalog 130 in a document store 128.

The analysis device 126 may operate according to a workflow, providing visualizations of data to an analyst at each of the workflow steps and allowing the analyst to generate output data by performing processing specific to the workflow step. The workflow may be generated and retrieved via a client browser 132. As the analysis device 126 performs the steps of the workflow, it may read raw data from a stream of data located in the raw data store 124. As the analysis device 126 performs the steps of the workflow, it may generate processed data that is stored in a metadata catalog 130 in a document store 128; alternatively or in addition, the processed data may be stored in a different location specified by a user of the analysis device 126. It may also generate audit records that may be stored in an audit log 134.

Figure 8:
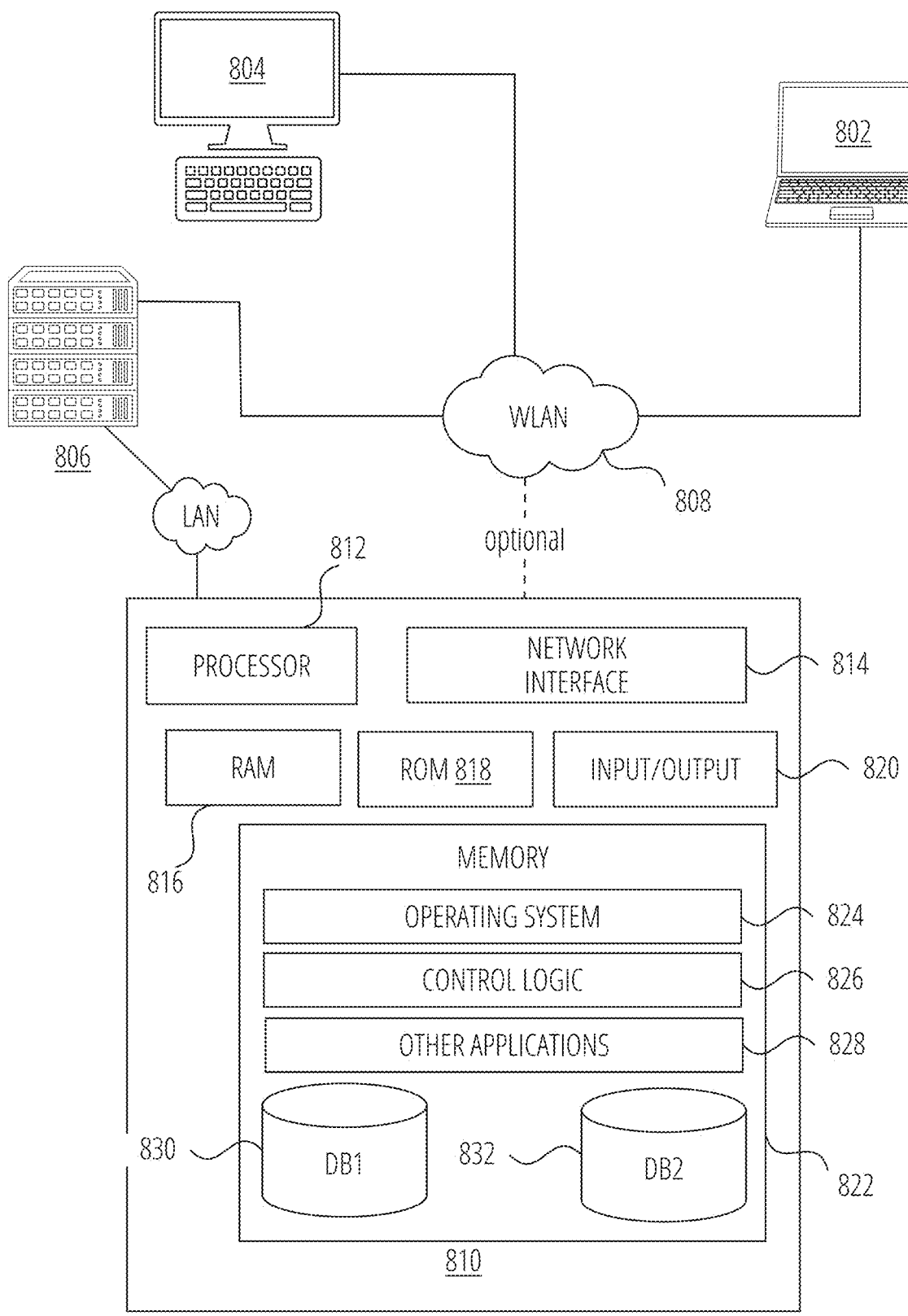
FIG. 8 depicts an illustrative computer system architecture that may be used to practice exemplary embodiments described herein.

The exemplary embodiments described herein may be performed at the client browser 132 and analysis device 126, among other locations. An example of a device suitable for use as an analysis device 126 and/or client browser 132, as well as various data storage devices, is depicted in FIG. 8.

Figure 2A:
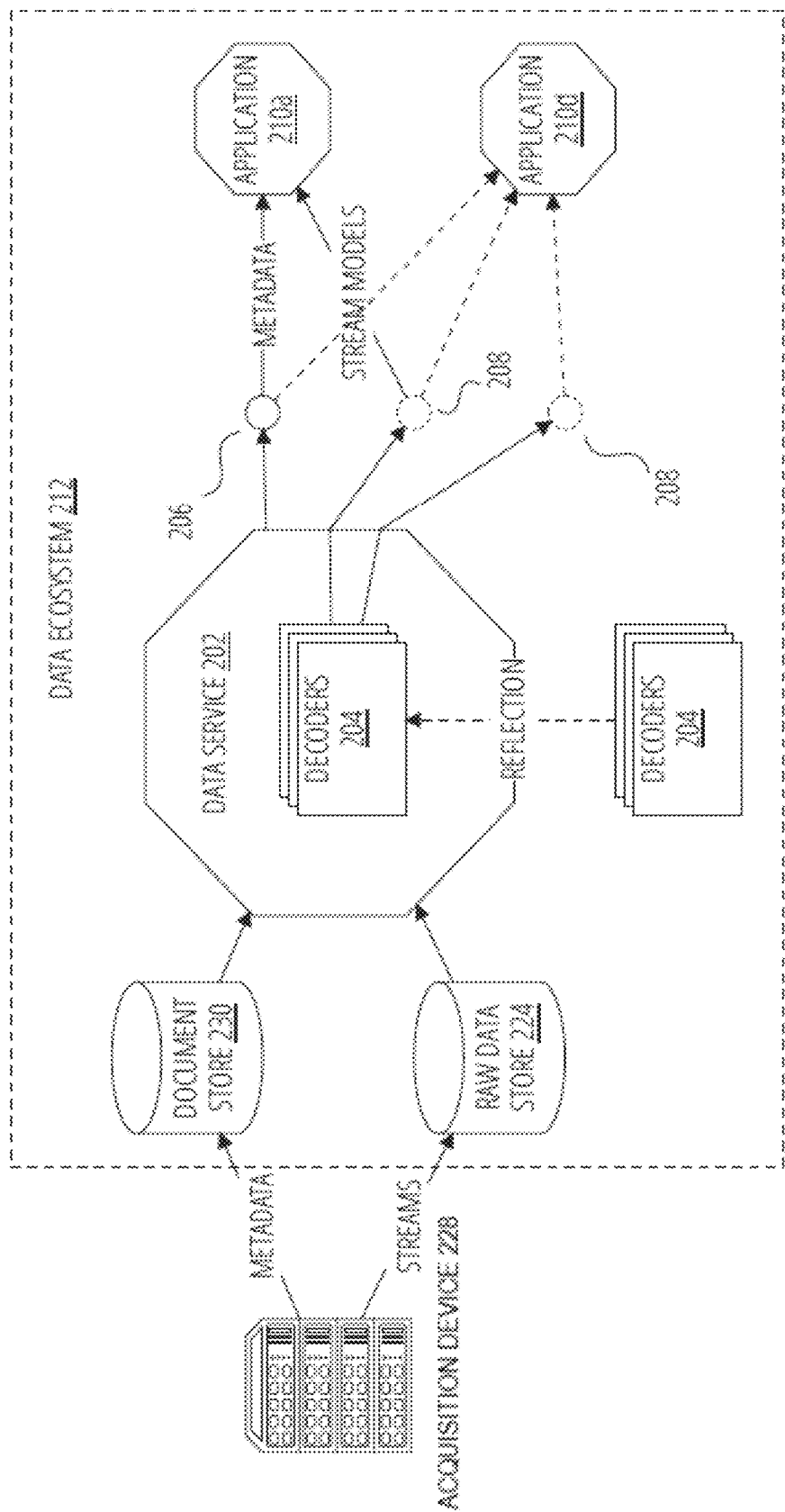
FIG. 2A illustrates a first exemplary data processing ecosystem in accordance with one embodiment.

FIG. 2A depicts an exemplary data ecosystem 212 for storing and retrieving chromatography data.

A chromatography acquisition device 228, such as a spectrometer, chromatography, or other device, may perform and output measurements (e.g., as a stream of readings formatted according to a data type that is specific to the acquisition device 228 and/or settings applied to the acquisition device 228). Those measurements may be stored in a raw data store 224.

In one example, the acquisition device 228 may acquire samples using an acquisition controller service. The acquisition controller service may submit the samples, via a RESTful API call, to an acquired data receiver autonomous service. The acquired data receiver autonomous service may create a sample set, which represents the multiple samples sent for analysis into an instrument. In other words, a sample set is an organized sequence of several injections that were sent into the chromatography apparatus.

The raw data raw data store 224 may include data from multiple different chromatography apparatuses and/or chromatography apparatuses operating in multiple different acquisition modes. Accordingly, the data processing environment acts as a single source of data for applications, regardless of which device generated the data (or which mode the data was operating in). Any application calling into the ecosystem can be sure that any acquired data can be accessed and processed appropriately.

The sample set may be stored in a sample set model store, while injection raw data blobs may be sent to a separate acquired data raw blob store.

The acquisition device 228 may also generate metadata describing the configuration of the acquisition device 228, details of the experiment being performed, a decoder configured to decode data generated for the experiment, etc. This metadata may be stored in a metadata catalog 130. As with the raw data store 224, the metadata catalog 130 may store metadata associated with multiple different acquisition devices in multiple different configurations.

The raw data may be decodable by a set of decoders 204, where each decoder is associated with a particular data type. For example, the decoder may be associated with a particular type of raw data generated by a chromatography instrument in a specific acquisition mode. That instrument may output a stream of raw data, including (e.g.) binary data, arrays of information, etc. The decoder may be programmed to parse a stream of raw data generated by such an instrument so that the data stream can be meaningfully interpreted.

In some embodiments, a single decoder may be associated with multiple data types; in further embodiments, multiple versions of the same decoder may each be associated with different data types. The decoders 204 may be embedded within a data service 202, such as an autonomous service (e.g., via reflection).

Each of the autonomous services may expose one or more endpoint interfaces. A particular decoder may be associated with each endpoint interface. The decoder may be configured to interpret the raw data that is associated with the endpoint interface.

For example, these endpoints may be Representation State Transfer (REST) endpoints capable of receiving RESTful Application Programming Interface (API) calls. An endpoint interface may receive a request for raw data acquired by a chromatography instrument. The data ecosystem 218 may expose multiple endpoint interfaces; for example, each autonomous service may be associated with and may expose at least one endpoint interface. An application 210a, 310c configured to process the raw data may call into the endpoint interface using an API call in order to retrieve the data.

The autonomous service (or another construct) may retrieve the requested raw data from a raw data store, apply the decoder to the raw data to generate decoded data, and may return the decoded data in response to the original request. For example, the autonomous service may apply the decoder to the raw data and provide decoded data to the requesting application, or the autonomous service may identify the decoder and provide it (or a location at which it can be accessed) to the requesting application along with the raw data (or a location of the raw data). In the latter case, the application may decode the data with the decoder.

Returning to the above described example, the autonomous service may retrieve the sample set models from the sample set model store and/or may retrieve the raw data blobs from the raw data blob store. The data may be decoded according to the decoder, and either version of the data (the raw data blobs or the sample set) may be provided to the application. The reason for supplying either or both of the raw data blobs and the sample set models is that the application may be tuned, for performance reasons, to use one or the other representation of the data.

By exposing the endpoint interfaces in this way, an application 210a, 310c can request data acquired by a chromatography instrument without needing to understand how to interpret the data. Furthermore, an application 210a, 210d may deposit the data in a known or common format into a central repository along with metadata indicating, e.g., when the data was received by the application, when the data was processed by the decoder, the identity of user who captured the data, the identity of the instrument that generated the data, and other information describing how and when the data was acquired. Accordingly, when new types of instruments are brought online (potentially outputting data in a different streaming format), it is not necessary to reprogram each application 210a, 310c that might use that data. Because each application 210a, 210d need not be programmed with specifics of how to interpret each different type of data stream, more different types of data can be made available to the applications, which allows for more complex analyses. This configuration also allows multiple different types of data to be stored together in a common source structure, simplifying data retrieval and storage.

In the depicted embodiment, the endpoint interfaces are of two types. A first type serves as a catalog endpoint 206, which is configured to receive requests for metadata. In response to receiving a request for metadata on the catalog endpoint 206, the data service 202 may identify the corresponding metadata in the metadata catalog 130. The data service 202 may then either return the requested metadata to the requesting application, or may return the location of the metadata so that it can be retrieved by the application as needed.

Another type of endpoint interface may serve as a data endpoint 208. There are generally a number of data endpoints 208 in the data ecosystem 212 corresponding to a number of data types that the raw data store 224 is capable of supporting. Each data endpoint 208 is characterized by a data type. When an application requests data, it may call into the raw data store or the metadata catalog to identify the type of the data; for example, the data may be tagged with a codec key that is stored with the data and/or in the metadata. The endpoint interfaces may be callable based on the data type, so once the data type is known the requesting application may identify the appropriate endpoint interface to decode the data and may formulate an appropriate RESTful API call to communicate with the interface. This provides an efficient way for the application to identify and call into the autonomous service that is capable of decoding the data.

Consequently, incoming requests are separated into metadata-specific requests and data-specific requests. Each is handled by a different type of endpoint. This helps to segregate incoming requests and provides requesting applications with a known endpoint to target for appropriate types of requests.

In this example, a single autonomous service handles requests for metadata and each different data type. Although straightforward to implement, it may be necessary to update the entire autonomous service every time one of the data types is changed, or a new data type is added. This can cause unnecessary downtime. Furthermore, the autonomous service needs to be capable of accessing both the metadata catalog 130 and the raw data store 224. These issues can be alleviated by dividing responsibility for different tasks between different autonomous services. An example of such an environment is described next in connection with FIG. 2B.

Figure 2B:
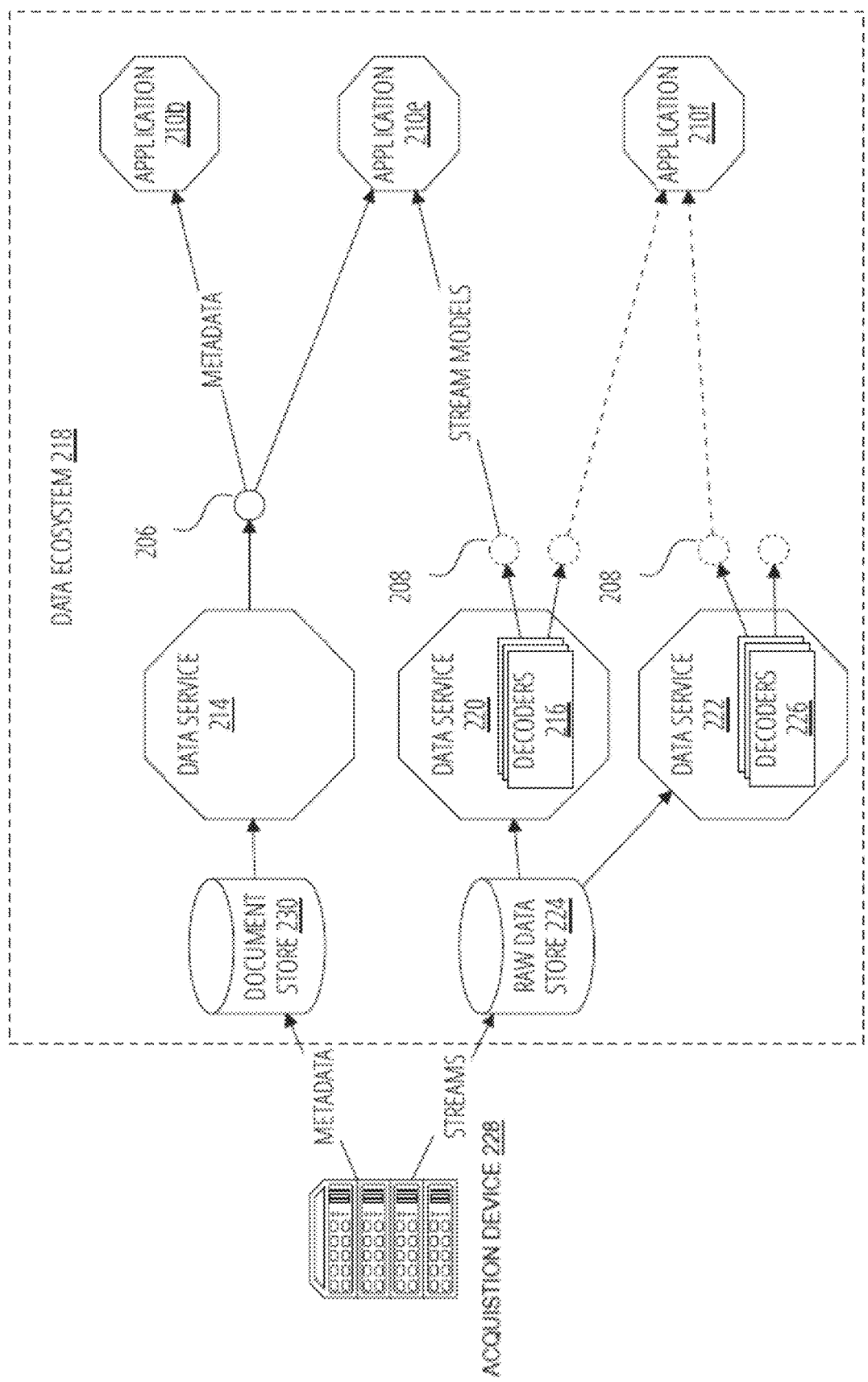
FIG. 2B illustrates a second exemplary data processing ecosystem in accordance with another embodiment.

FIG. 2B illustrates an alternative configuration in which (1) metadata requests are all directed to a particular data service 214, which interfaces with the document store 230 but not the raw data store 224, and (2) data requests are submitted to any of a number of additional autonomous services, each of which has a particular decoder or set of decoders embedded and handles requests specific to the data type of its embedded decoders.

In this configuration, multiple data services 220, 322, etc. service incoming requests for data. Furthermore, at least one data service 214 is specifically configured to respond to requests for metadata. The data service 214 responding to metadata requests does not respond to requests for data, and accordingly does not need to implement any functionality related to the decoders. Similarly, the data services 220, 322, etc. responding to data requests do not need to implement any of the functionality for querying the metadata catalog. When new data types are added, a new autonomous service implementing the decoder for the new data type may be added, or an existing autonomous service may be updated with the new functionality. Meanwhile, most of the autonomous services can remain unchanged. Similarly, if the metadata catalog API is ever changed, only the metadata-handling autonomous service needs to be updated.

The raw data raw data store 224 includes data of multiple different data types. Collectively, the autonomous services may be configured to decode each of the plurality of different data types. For example, the multiple different data types may be included in an interface specification, which may describe how to decode the various different types. The interface specification may be capable of being implemented, at least in part, by each of the autonomous services by implementing corresponding data endpoints 208 and decoders 216, 324. Each data service 220, 322 may be associated with a different set of decoders 216, 324, although there may be some overlap in the decoders supported by different data services. However, no single data service implements all of the decoders, so the functionality for decoding different types of data is distributed across multiple data services. Therefore, different parts of the interface specification may be split between multiple different autonomous services, so that each implements a part, but not all, of the interface specification. Each part of the interface specification may be implemented by at least one of the autonomous services so that, collectively, the group of interface services implements the interface specification.

Because each autonomous service is tasked with only implementing a portion of the interface specification, each autonomous service can be made simpler (since it need not be concerned with providing decoders and endpoint interfaces for portions of the interface specification that it does not implement). New autonomous services can be easily added to deal with new capabilities, and it is not necessary to take down all of the autonomous services when one decoder needs to be updated.

Figure 3:
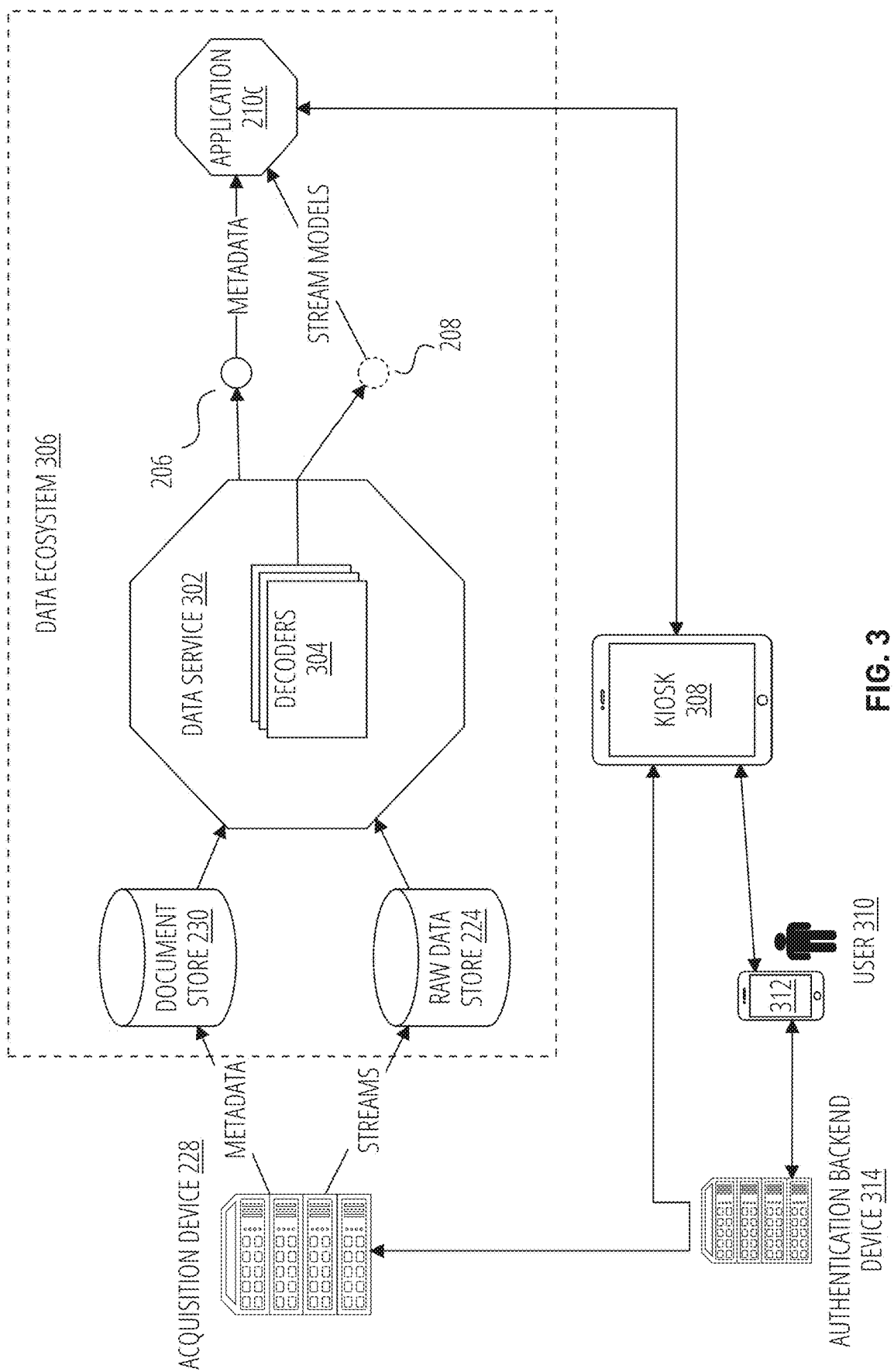
FIG. 3 illustrates a first exemplary data processing ecosystem in accordance with one embodiment.

FIG. 3 depicts an exemplary data ecosystem 306 for storing and retrieving chromatography data. This embodiment may be used in connection with the embodiment depicted in FIG. 2A (in which case the decoders 304 may correlate to the decoders 204), the embodiment depicted in FIG. 2B (where the decoders 304 may correlate to the decoders 216, 226), or any other suitable configuration.

A kiosk 308 may be a dedicated computing device for performing authentication and authorization or may include authentication and authorization functionality built into another device. The kiosk 308 may be capable of interacting with an acquisition device 228 and/or an application 210c (among other possibilities, such as the analysis device 126 or client browser 132) to authorize a user 310 to use the connected device(s).

To that end, the kiosk 308 may include a short-range wireless transmitter/receiver (e.g., a near field communication, or NFC, reader, a camera for a visual code, etc.). The kiosk 308 may be configured to receive, via the short-range wireless transmitter/receiver, a wireless transmission of a secure token from the user's mobile device 312. The secure token may include login credentials for the user 310 and, optionally, an identification of a device or application that the user is attempting to access. The secure token may be encrypted.

Figure 4B:
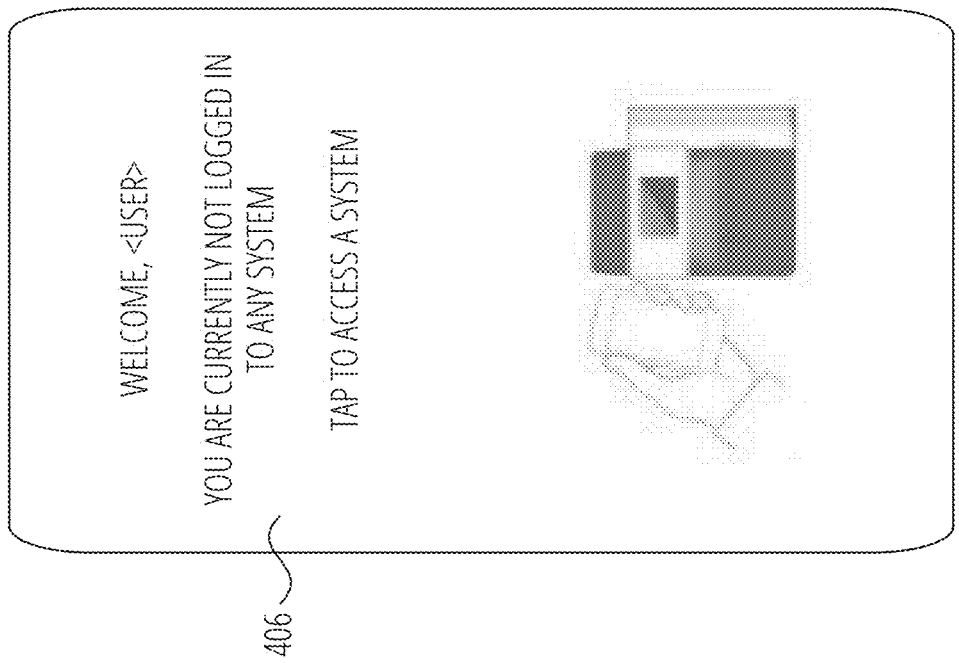
FIG. 4B depicts another example of a graphical user interface in accordance with one embodiment.
Figure 4A:
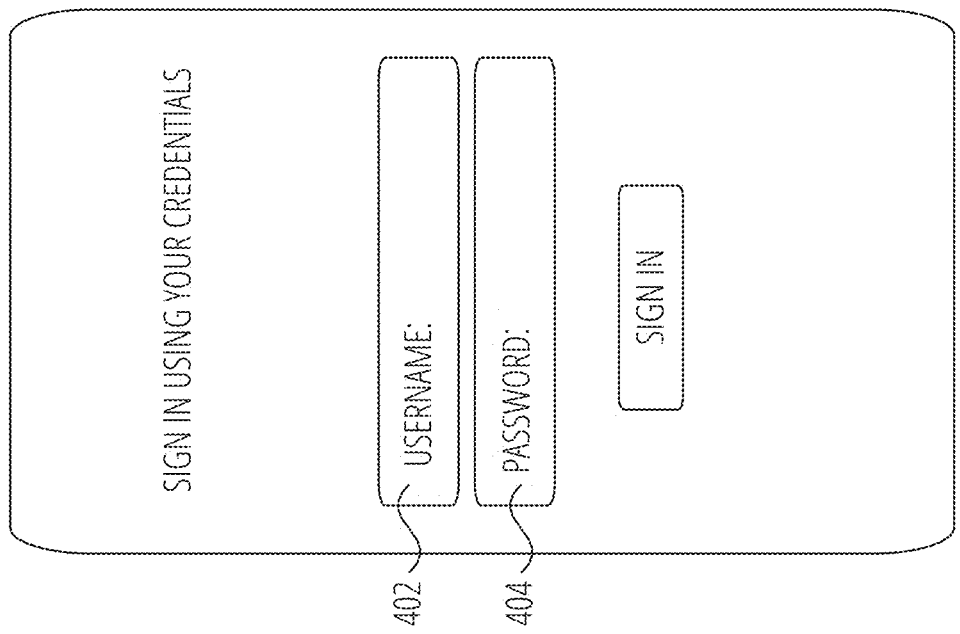
FIG. 4A depicts an example of a graphical user interface in accordance with one embodiment.

In some embodiments, the user 310 may be required to log in to an application on their mobile device 312 before being presented with an opportunity to transmit the login credentials to the kiosk 308 (see, e.g., FIG. 4A and FIG. 4B). This provides an additional degree of security, since an unauthorized user would need to be in physical possession of the user's mobile device 312 and know the user's login name and password in order to authorize use of the data ecosystem 306 via the kiosk 308.

In some embodiments, the user may not need to log into the application, or a previous login may continue to provide access for a period of time (e.g., six hours, one day, one week, etc.). The period of time may be predetermined based on the context and security requirements of the organization maintaining the data ecosystem 306, or may be dynamically determined based on current security conditions. If a previous authorization is in effect, the kiosk 308 may automatically receive the short-range communication unprompted by the user 310. For example, the kiosk 308 may continuously prompt for a new login via the short-range communication. When the user 310 brings their mobile device 312 in close proximity to the kiosk 308, the mobile device 312 may receive the prompt from the kiosk 308 and automatically respond with the secure token. The mobile device 312 may be configured to run an application in the background in order to detect and respond to the prompt automatically. Accordingly, the user can be logged into the data ecosystem 306 via the kiosk 308 without needing to remove the mobile device 312 from the user's pocket, bag, or other storage location.

The login credentials may be sent from the kiosk 308 to an authentication backend device 314, such as a server, for validation. The authentication backend device 314 may verify that the user's login credentials are valid (e.g., that the credentials correspond to a real user), and that the user is authorized to use the device or application for which access is requested. The authentication backend device 314 may send a confirmation or rejection to the kiosk 308, depending on whether the authentication backend device 314 can verify the user's credentials.

In some embodiments, the login credentials in the secure token may include a data value representing a universal access key common to all authorized users of the system. The kiosk 308 may recognize the universal access key and permit access to the data ecosystem 306. Use of the universal access key may be controlled by the user's application on the mobile device 312 so that if authorization needs to be removed from a given user, the user's application can be configured not to provide access. The user's application can be so configured when logging into the application on their mobile device (which may involve connecting to an authentication server; this may be the same authentication backend device 314 as previously discussed or may be another authentication device). In this way, authentication can be performed in a relatively simple manner because the authentication backend device 314 only needs to recognize one set of credentials: the universal access key.

In other embodiments, each user may be assigned their own access key. Although this may be more complicated from the perspective of the authentication backend device 314, it may allow for individual users to be quickly authorized or de-authorized by adding their unique access key to a list stored at the authentication backend device 314.

The kiosk 308 may be configured to send a command signal to a connected device authorizing a user 310 to use the connected device. In response to receiving the command signal, the connected device may become unlocked and capable of processing instructions from the user (received directly on the connected device, through the kiosk 308, via the user's mobile device 312, or through another device such as the analysis device 126). In the absence of such a command signal, the connected device may be locked and may refrain from accepting or processing commands from any unauthorized users.

When the user logs in or logs out through the kiosk 308, the kiosk 308 may generate an instruction to create an audit record storing the user's identifier, the action taken (e.g., logging in or logging out), a timestamp, and any other relevant data used in an audit record. The kiosk 308 may generate the audit record and transmit it to a device responsible for maintaining an audit trail, such as the analysis device 126 and/or audit log 134. Alternatively or in addition, the audit record may be generated by another device, such as the analysis device 126 or authentication backend device 314. In some embodiments, the kiosk 308 and mobile device 312 may work together to create the audit record.

FIG. 4A depicts an interface for an application on the user's mobile device 312 that may be used as part of an authentication process. The application may be provided by an organization or entity responsible for maintaining the data ecosystem 306, or by a third party. The user may be required to log in to the application before a security token can be generated by the mobile device.

The interface shown in FIG. 4A includes a user name prompt 402 in which a user can supply their user name, and a password prompt 404 allowing the user to provide their password. A user can then select a "sign in" interface element to sign in to the mobile application.

FIG. 4A depicts only one option for logging into the mobile application. In other embodiments, for example, a user might log in using a code such as a PIN, biometric information, such as a facial scan, iris scan, fingerprint, voice confirmation, etc.

Upon logging in to the mobile application via the interface shown in FIG. 4A, the user may be presented with a confirmation interface such as the one shown in FIG. 4B. The confirmation interface may confirm that the user has successfully logged in to the mobile application, and may provide further instructions for logging in to the kiosk 308.

Figure 5:
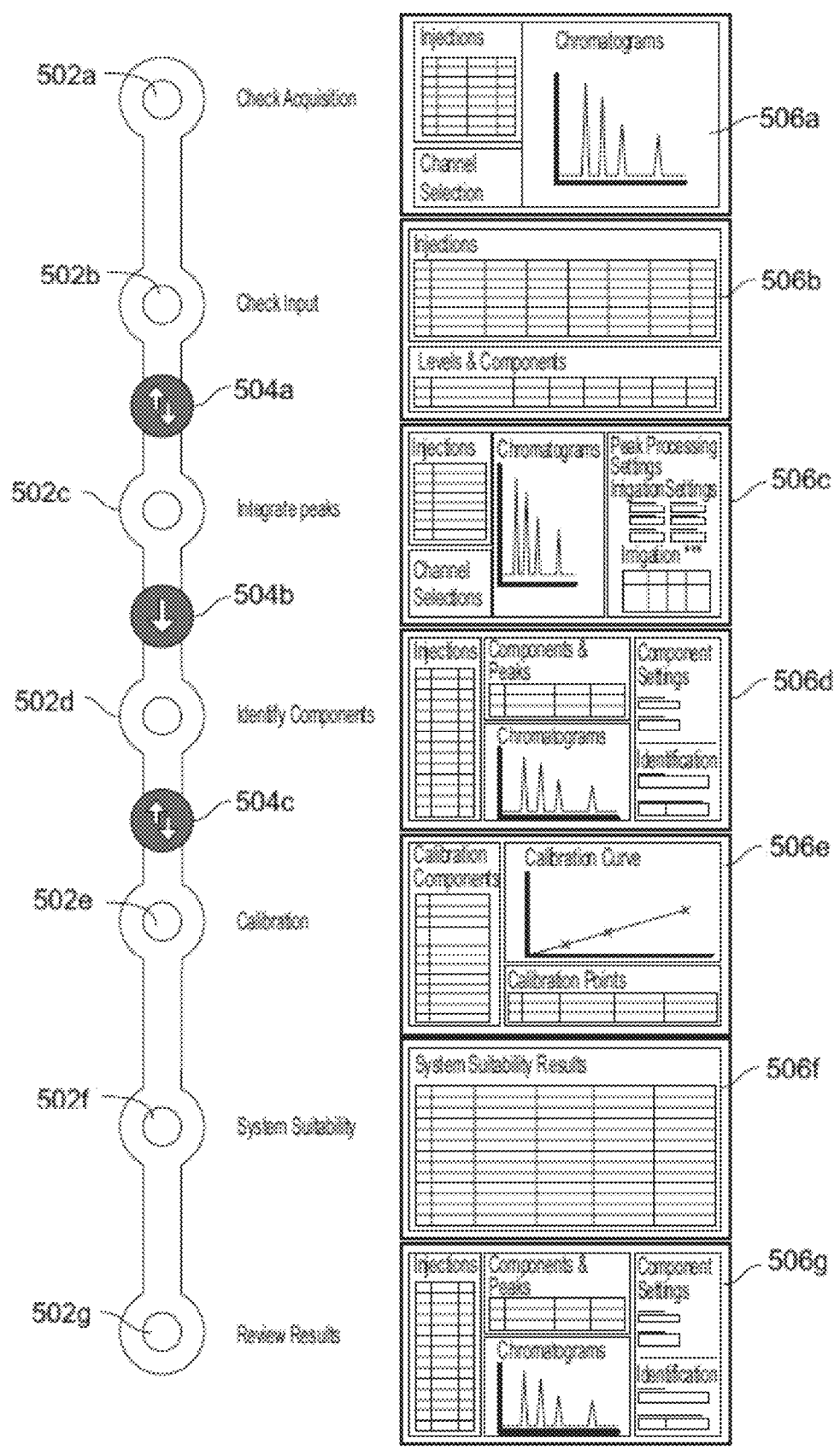
FIG. 5 depicts an exemplary interface for a workflow builder, including workflow steps, transitions, and visualizations associated with each step, according to an exemplary embodiment.

As previously noted, logging in to the kiosk 308 may cause an audit record to be automatically created and added to an audit trail. The audit trail may track the actions that are performed as data is collected and analyzed for a sample. These actions are typically organized into a workflow; an example of such a workflow is shown in FIG. 5.

In the workflow, a set of steps 502a-502g are arranged in an order. In some cases, a relative ordering of certain steps may be enforced by an application such as a workflow builder (e.g., requiring that the integrate peaks step 502c be performed before the calibration step 502e).

Some or all of the steps may be separated by transitions 504a-304c. The transitions may be associated with a direction (e.g., a forward direction in the order, a reverse direction, or a forward direction and a reverse direction). Each of the transitions may be associated with (and/or may be created in response to) a change in data stewardship; responsibility for the data may be changed from a group of users associated with the steps before the transition to a group of users associated with the steps after the transition. The application may require that the group of users relinquishing and/or acquiring data access rights provide a signature.

Crossing a transition and/or providing the signature may cause a results set to be generated and may cause an audit record to be created. The audit record may include, among other possibilities, the identity of the user or users who performed the action that generated the result set, the settings of any devices used in the step and/or the parameters used to process the data, the order in which the data was processed and the results that were generated, a timestamp indicating when the data was gathered or processed, a copy of the signature used to sign off on the data, and any other information that is required by the regulatory rules or scientific standard for which the audit record is created. In exemplary embodiments, records may be created for log on and log off actions, which may include a timestamp, the identity of the user, a flag indicating whether the user logged in with multi-factor authentication, and identifiers of any associated audit records (such as records created by carrying out steps in the workflow while the user was logged in to the kiosk 308).

FIG. 5 also depicts exemplary configurations for the steps (e.g., configurations and arrangements of visualization elements, settings for the step and/or visualization elements, etc.); for instance, FIG. 5 provides examples of pages 506a-506g that have been selected for, and associated with, each of the steps 502a-502g.

Figure 6:
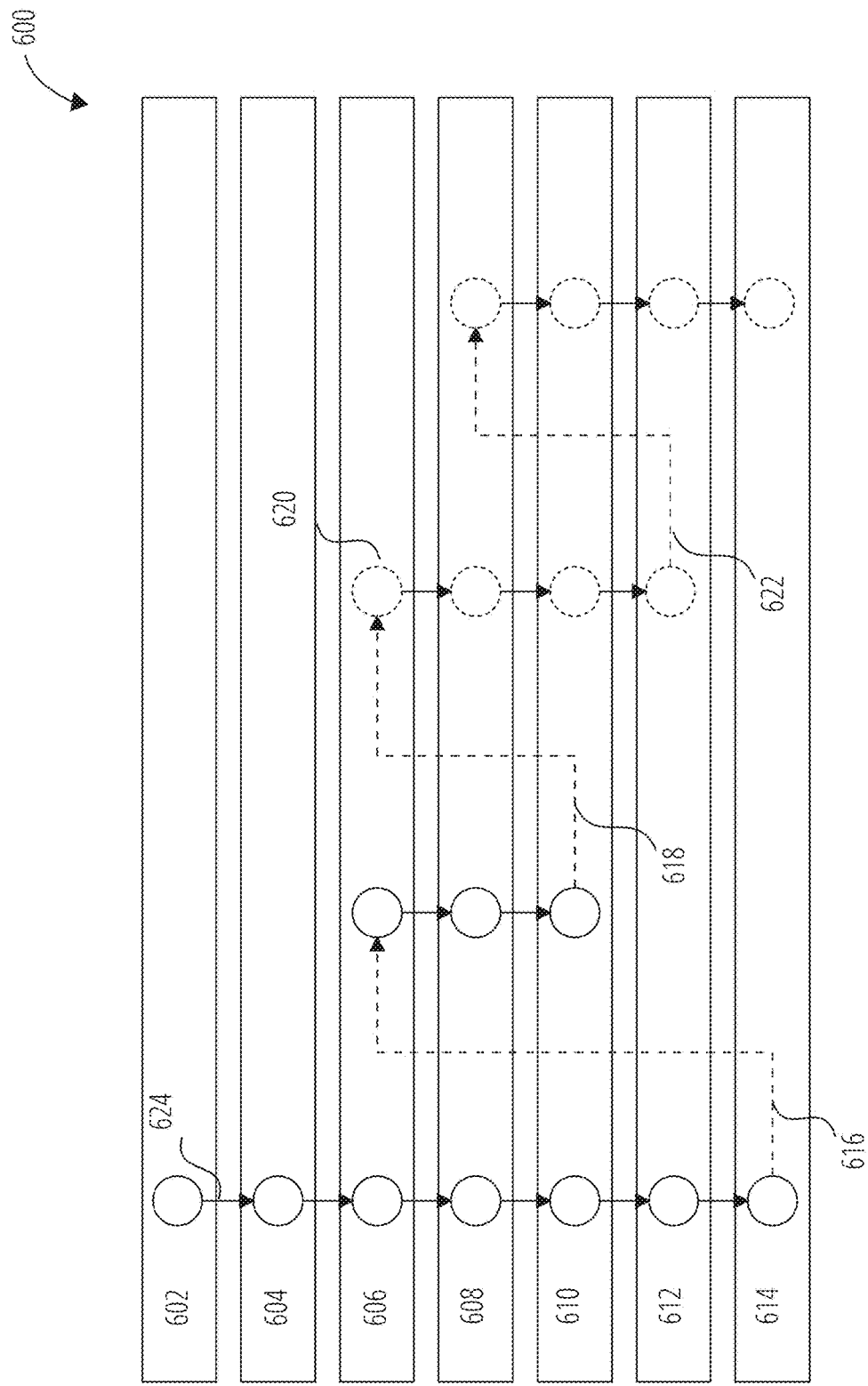
FIG. 6 depicts a simplified example of a result set being updated as a user moves through an exemplary process workflow in accordance with one embodiment.

FIG. 6 depicts an exemplary processing activity map 600 providing a visualization of an audit trail. The visualization may show how and when changes were made to a workflow's settings. The processing activity map 600 may be generated based on audit records corresponding to each of the nodes in the processing activity map 600.

The workflow represented in the processing activity map 600 includes seven stages: check acquisition stage 602, check inputs stage 604, integrate peaks stage 606, identify components stage 608, calibration stage 610, system suitability stage 612, and results stage 614. A description of the specific processing performed by each stage is not necessary to understand the processing activity map 600 and is therefore omitted for the sake of brevity.

In the processing activity map 600, each circular node corresponds to a result set which, as noted above, is updated with the output from each stage. A change in the version number of the result set is indicated by a change in the outline of the node (e.g., from solid to dashed lines). In this example, two result sets are generated; the processing activity map 600 allows reviewers to understand what changes were made to the workflow settings throughout the analysis, and to determine whether the changes were appropriate.

Each time the user advances to the next stage in the workflow, this is marked in the processing activity map 600 by a step boundary transition 624. In this example, the user first proceeded all the way through the analysis, from the check acquisition stage 602 to the results stage 614 (as indicated by the nodes connected by step boundary transitions 624 on the left side of the processing activity map 600).

After the user finished the analysis and obtained results, the user moved backwards in the workflow to integrate peaks stage 606. This is part of the trigger condition, but the trigger condition is a multi-part requirement (the user must move backwards in the workflow and change a workflow setting). The backwards movement is indicated in the processing activity map by a step boundary reversal 616, which is similar to the step boundary transition 624 but is visually distinguished (in this case, by using a dashed line) because it represents one part of the requirement for the trigger condition. The result set may also now be associated with a reversal flag indicating that part of the trigger condition has been met.

In this example, the user then proceeds from the integrate peaks stage 606 to the calibration stage 610 without making changes to the workflow settings. Thus, the second part of the trigger has not yet been met. Afterwards, the user performs another step boundary reversal 618, returning to the integrate peaks stage 606 again. At this point, however, the user makes a change 620 to the workflow settings (e.g., switching to manual peak integration). This triggers the second part of the trigger. In response to detecting the second part of the trigger, the analysis device 126 checks to see if the reversal flag is set (it is). Upon detecting the presence of the reversal flag and a change to the workflow settings, the analysis device 126 determines that the trigger conditions have been met and versions the result set. In order to identify that the result set has been changed to a new version, the outline of the node is changed to a dashed line, which persists until the result set is updated to yet a further version (not pictured) due to the trigger condition being met again.

When the result set is updated to a new version, the reverse flag is cleared. Proceeding through the example, the user next continues through the workflow to the system suitability stage 612, where the user performs another step boundary reversal 622 to identify components stage 608. The reverse flag is accordingly set again. However, the user then proceeds from the identify components stage 608 to the results stage 614 without making any further changes, so the node associated with the result set is not further updated to indicate another version.

The processing activity map 600 may be stored on a non-transitory computer-readable storage medium and called up for display on a user interface. The processing activity map 600 may be interactable. For example, hovering over or clicking on a given node may show details about the result set indicated by the node, such as the node version number. If a user hovers or clicks on a node indicating a new version, then the changes to workflow settings that resulted in the new version may be shown. The user who made the change may be identified, as well as any comments or reasons given for the change. The sub-document associated with the output of the stage whose settings were changed may be selectable, with any differences between the changed sub-document and any previous versions of the sub-document highlighted.

In some embodiments, the processing activity map may be built as a user proceeds through the workflow, being updated in parallel with the workflow as the user transitions between stages, meets trigger conditions, and causes the result set to be updated. For instance, the current version of the processing activity map may be stored in the result set, or elsewhere accessible to the workflow processors. In other embodiments, the processing activity map 600 may be generated on-the-fly based on the version numbers of the result sets associated with the experiments and/or the version numbers of the sub-documents in the results sets.

Note that solid, dashed, and dotted lines are used in this example purely for illustrative purposes. Differences in the versions of the result set and actions matching trigger conditions may be indicated in any suitable manner for visually distinguishing the differences, such as by using different colors, different shapes, different styles, etc.

In some embodiments, the processing activity map 600 may indicate login and logout actions, or may be altered to show which users were logged in during which steps. For instance, an administrator may be able to identify a given user, and may be shown which nodes were performed while the user was logged in to the system (e.g., by highlighting the nodes, changing their colors, etc.). Different users may be visually represented in different ways on the processing activity map 600, allowing the administrator to see which users handed off processing or data acquisition to which other users.

Figure 7:
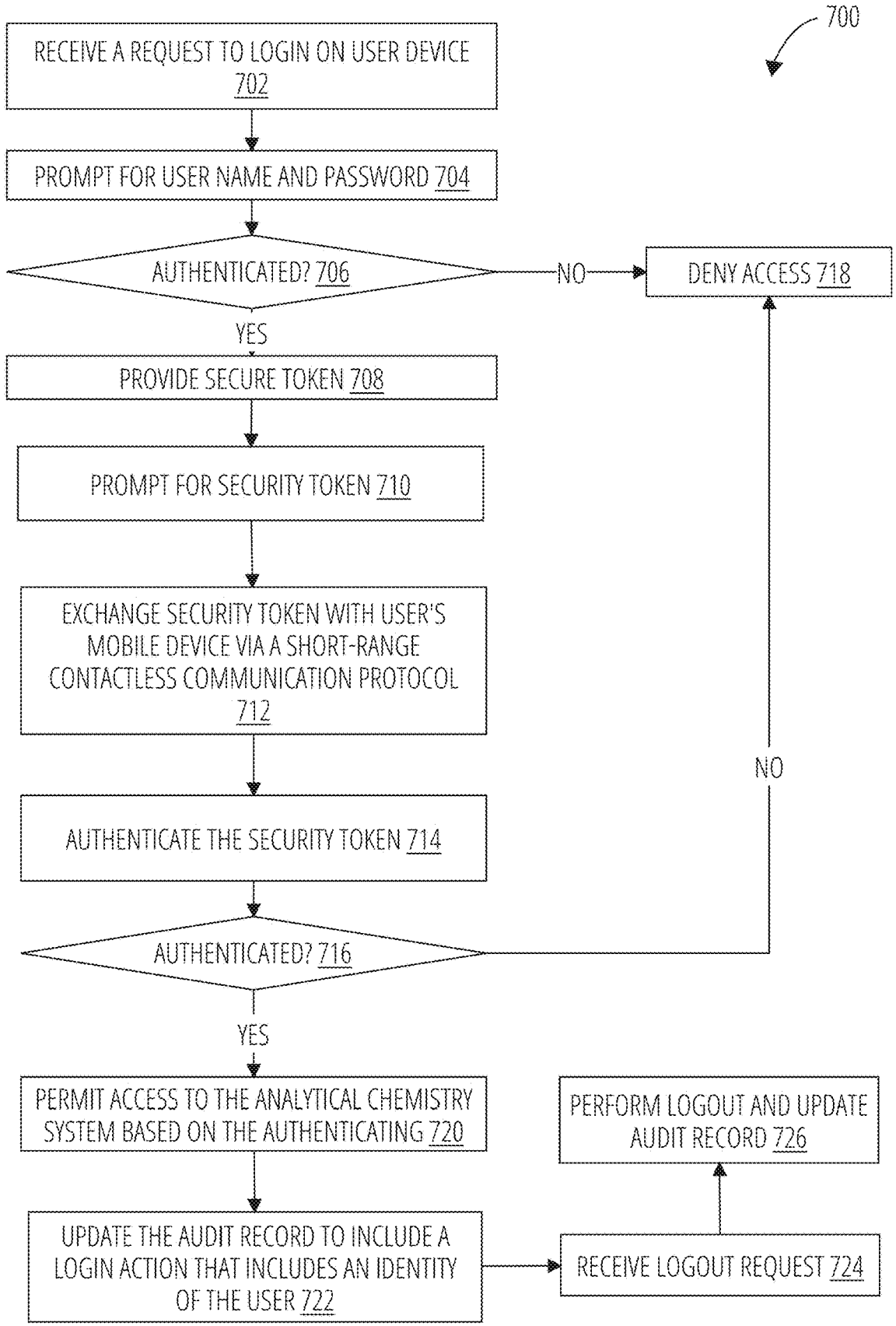
FIG. 7 depicts exemplary logic for performing a method in accordance with one embodiment.

FIG. 7 is a flowchart depicting exemplary logic for performing a computer-implemented method according to an exemplary embodiment. The logic may be embodied as instructions stored on a computer-readable medium configured to be executed by a processor. The logic may be implemented by a suitable computing system configured to perform the actions described below.

In block 702, the user may submit a request to login to a credentialing application associated with an analytical chemistry system may receive a request to access the system on behalf of a user. For example, the user may access the credentialing application on their mobile device and may select a login interface element to request that the credentialing application log them in.

At block 704, the user may be prompted to enter their user name and password into the credentialing application on their mobile device (see, e.g., FIG. 4A). The user may enter their login credentials, which may be login credentials for an entity that maintains the analytical chemistry system or a third-party entity. The login credentials may be transmitted to an authentication server associated with the mobile application, which may confirm that the user is an authorized user of the entity at block 706. For example, if the analytical chemistry system is maintained by a particular analysis company, then the mobile application may be an application of the analysis company and the authentication server may authenticate that the user is a valid user (e.g., an employee or contractor) of the analysis company. Alternatively, the analysis company may outsource authentication procedures to a third party, such as a computer security company, and the computer security company may issue login credentials to valid users of the analysis company.

If the authentication server determines, at block 706, that the user is not an authorized user, then processing may proceed to block 718 and the user may be denied access to the analytical chemistry system. In this case, denying access might involve restricting or preventing the mobile application on the user's mobile device from generating a security token that can be transmitted to the kiosk. In this way, the kiosk never receives the security token and will not verify whether the security token is authorized.

If the authentication server instead determines that the user is an authorized user, then at block 708 the user's mobile device may receive a copy of a security token. In some embodiments, the security token may be generated by the credentialing app in response to a successful login attempt, while in others the security token may be provided by the authentication server.

At block 710, a kiosk associated with the analytical chemistry system may prompt the user's mobile device to provide the security token. The kiosk may be listening to receive a short range wireless transmission from (e.g.) a mobile device. The short range wireless transmission may be, for example, a near field communication (NFC) transmission. The mobile device may transmit the short range wireless transmission in response to receiving a request from a user (e.g., via a mobile application) to log into an analytical chemistry system in an application. Alternatively or in addition, the mobile device may be configured to continuously transmit a short range wireless signal, or to transmit such a signal under certain conditions (e.g., when the mobile device enters a particular geofenced area associated with the analytical chemistry system).

In some embodiments, the user may manually select a login icon on the kiosk, which may cause the kiosk to begin scanning for the security token. For example, the kiosk may engage a camera or visual sensor to scan for a barcode or a QR code that is being displayed on a display of the user's device.

In block 712, the kiosk may exchange a security token with the mobile device via the short-range communication. The short range communication may involve a wireless and/or contactless transmission such as using NFC or BLUETOOTH®, a visual communication such as scanning a visual code using a camera, or any other suitable style of communication.

As previously noted, the security token may include an access key. In block 714, the kiosk may validate the security token, such as by comparing the access key to an expected access key stored at the kiosk. In some embodiments, the kiosk may validate the access key by transmitting it to an authentication server in order to verify that the access key is valid.

If the authentication server reports, at decision block 716, that the access key is not valid, then processing may proceed to block 718 and the user may be denied access to the analytical chemistry system. In this case, a message may be displayed on the kiosk indicating that the user is not authorized, and the kiosk may refrain from generating a control signal unlocking the devices and applications of the analytical chemistry system for use.

On the other hand, if the access key is validated at decision block 716, then at block 720 the kiosk may permit access to the analytical chemistry system based on the authenticating. This may involve generating and transmitting a control signal that unlocks associated laboratory analytical instruments for use by the user, and/or that unlocks applications of a data ecosystem for use. The applications may be used to generate and analyze data in the analytical chemistry system. In some embodiments, interfaces for the applications and/or the laboratory analytical instruments may be accessible through the kiosk, in which case block 720 may involve presenting these interfaces on a display of the kiosk.

In some embodiments, the kiosk and the mobile device may be capable of exchanging information about the analytical chemistry system with each other. This information might include user preference information, information about the laboratory analytical instruments such as settings or parameters (e.g., column settings), and other relevant information. This information may be exchanged as part of block 720, either using the short-range contactless communication protocol or with a relatively longer-range contactless protocol (e.g., BLUETOOTH®). The specific protocol used may be selected based on the amount of data that needs to be exchanged and/or based on the power consumption of the protocol (allowing the mobile device to conserve battery power with a lower-power protocol, when transmission conditions and the amount of data to be exchanged permit). If the kiosk receives preferences or settings from the mobile device, the kiosk may automatically implement the received settings to the extent possible.

At block 722, the an audit trail associated with the analytical chemistry system may be updated to include a login action by the user. The identity of the user and a timestamp may be recorded in an audit record and added to the audit trail.

At block 724, the system may receive a logout request on behalf of the user. For example, the user could select a "logout" interface element on the display of the kiosk, might log out via the application on their mobile device, or might swipe their mobile device's short range communication transmitter over a corresponding short range communication receiver of the kiosk. This gesture may be interpreted as the user attempting to log out of the system. In some embodiments, the user may be asked to confirm their intention to log out to prevent unrequested log out attempts if the user happens to bring their device near the wireless reader of the kiosk. At block 726, the user may be logged out of the analytical chemistry system and a corresponding logout record may be created in the audit trail. The logout record may be similar to the audit record created when logging in via the kiosk and may include similar information.

Although FIG. 7 depicts particular actions performed in a specific order, embodiments are not limited to the configuration shown in FIG. 7. It is contemplated that more, fewer, or different logical blocks may be implemented. Similarly, it is contemplated that the actions may be performed in a different order than the one shown in FIG. 7.

FIG. 8 illustrates one example of a system architecture and data processing device that may be used to implement one or more illustrative aspects described herein in a stand-alone and/or networked environment. Various network nodes, such as the data server 810, web server 806, computer 804, and laptop 802 may be interconnected via a wide area network 808 (WAN), such as the internet. Other networks may also or alternatively be used, including private intranets, corporate networks, LANs, metropolitan area networks (MANs) wireless networks, personal networks (PANs), and the like. Network 808 is for illustration purposes and may be replaced with fewer or additional computer networks. A local area network (LAN) may have one or more of any known LAN topology and may use one or more of a variety of different protocols, such as ethernet. Devices data server 810, web server 806, computer 804, laptop 802 and other devices (not shown) may be connected to one or more of the networks via twisted pair wires, coaxial cable, fiber optics, radio waves or other communication media.

Computer software, hardware, and networks may be utilized in a variety of different system environments, including standalone, networked, remote-access (aka, remote desktop), virtualized, and/or cloud-based environments, among others.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 810, web server 806, and client computer 804, laptop 802. Data server 810 provides overall access, control and administration of databases and control software for performing one or more illustrative aspects described herein. Data server data server 810 may be connected to web server 806 through which users interact with and obtain data as requested. Alternatively, data server 810 may act as a web server itself and be directly connected to the internet. Data server 810 may be connected to web server 806 through the network 808 (e.g., the internet), via direct or indirect connection, or via some other network. Users may interact with the data server 810 using remote computer 804, laptop 802, e.g., using a web browser to connect to the data server 810 via one or more externally exposed web sites hosted by web server 806. Client computer 804, laptop 802 may be used in concert with data server 810 to access data stored therein, or may be used for other purposes. For example, from client computer 804, a user may access web server 806 using an internet browser, as is known in the art, or by executing a software application that communicates with web server 806 and/or data server 810 over a computer network (such as the internet).

Servers and applications may be combined on the same physical machines, and retain separate virtual or logical addresses, or may reside on separate physical machines. FIG. 8 illustrates just one example of a network architecture that may be used, and those of skill in the art will appreciate that the specific network architecture and data processing devices used may vary, and are secondary to the functionality that they provide, as further described herein. For example, services provided by web server 806 and data server 810 may be combined on a single server.

Each component data server 810, web server 806, computer 804, laptop 802 may be any type of known computer, server, or data processing device. Data server 810, e.g., may include a processor 812 controlling overall operation of the data server 810. Data server 810 may further include RAM 816, ROM 818, network interface 814, input/output interfaces 820 (e.g., keyboard, mouse, display, printer, etc.), and memory 822. Input/output interfaces 820 may include a variety of interface units and drives for reading, writing, displaying, and/or printing data or files. Memory 822 may further store operating system software 824 for controlling overall operation of the data server 810, control logic 826 for instructing data server 810 to perform aspects described herein, and other application software 828 providing secondary, support, and/or other functionality which may or may not be used in conjunction with aspects described herein. The control logic may also be referred to herein as the data server software control logic 826. Functionality of the data server software may refer to operations or decisions made automatically based on rules coded into the control logic, made manually by a user providing input into the system, and/or a combination of automatic processing based on user input (e.g., queries, data updates, etc.).

Memory 1122 may also store data used in performance of one or more aspects described herein, including a first database 832 and a second database 830. In some embodiments, the first database may include the second database (e.g., as a separate table, report, etc.). That is, the information can be stored in a single database, or separated into different logical, virtual, or physical databases, depending on system design. Web server 806, computer 804, laptop 802 may have similar or different architecture as described with respect to data server 810. Those of skill in the art will appreciate that the functionality of data server 810 (or web server 806, computer 804, laptop 802) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method comprising:
   receiving, at a kiosk associated with an analytical chemistry system, a request to access the analytical chemistry system on behalf of a user, the analytical chemistry system comprising an instrument configured to perform one or more of liquid chromatography or mass spectrometry, wherein the analytical chemistry system is associated with an audit record storing information about an analytical workflow for processing a sample by the analytical chemistry system;
   prompting for the user to transmit a security token to the kiosk;
   exchanging the security token between the kiosk and a mobile device associated with the user via a short-range communication;
   verifying a validity of the security token;
   permitting access to the analytical chemistry system based on the authenticating; and
   updating the audit record to include a login action that includes an identity of the user.

2. The computer-implemented method of claim 1, wherein the audit record is a record in an audit trail that complies with a regulatory or scientific standard.

3. The computer-implemented method of claim 1, wherein the security token is provided to the mobile device in response to the user successfully logging into a credentialing application on the mobile device.

4. The computer-implemented method of claim 3, wherein logging into the credentialing application comprises:
   receiving a user name and password from the user;
   authenticating the user name and password; and
   providing the security token in response to authenticating the user name and password.

5. The computer-implemented method of claim 1, wherein the security token is a data structure and the short range communication comprises receiving a contactless transmission of the data structure from the mobile device.

6. The computer-implemented method of claim 1, wherein the security token is a visible code and the short-range communication comprises scanning the visible code from a display of the mobile device using an image sensor.

7. The computer-implemented method of claim 1, further comprising:
   receiving a request to log out of the analytical chemistry system;
   prompting for the user's security token;
   exchanging a the security token between the kiosk and the mobile device;
   logging the user out of the analytical chemistry system; and
   updating the audit record to include a logout action that includes the identity of the user.

8. A non-transitory computer-readable storage medium, the computer-readable storage medium including instructions that when executed by a computer, cause the computer to:
   receive, at a kiosk associated with an analytical chemistry system, a request to access the analytical chemistry system on behalf of a user, the analytical chemistry system comprising an instrument configured to perform one or more of liquid chromatography or mass spectrometry, wherein the analytical chemistry system is associated with an audit record storing information about an analytical workflow for processing a sample by the analytical chemistry system;
   prompt for the user to transmit a security token to the kiosk;
   exchange the security token between the kiosk and a mobile device associated with the user via a short-range communication;
   verify a validity of the security token;
   permit access to the analytical chemistry system based on the authenticating; and
   update the audit record to include a login action that includes an identity of the user.

9. The computer-readable storage medium of claim 8, wherein the audit record is a record in an audit trail that complies with a regulatory or scientific standard.

10. The computer-readable storage medium of claim 8, wherein the security token is provided to the mobile device in response to the user successfully log into a credentialing application on the mobile device.

11. The computer-readable storage medium of claim 10, wherein logging into the credentialing application comprises:
    receive a user name and password from the user;
    authenticate the user name and password; and
    provide the security token in response to authenticating the user name and password.

12. The computer-readable storage medium of claim 8, wherein the security token is a data structure and the short range communication comprises receive a contactless transmission of the data structure from the mobile device.

13. The computer-readable storage medium of claim 8, wherein the security token is a visible code and the short-range communication comprises scan the visible code from a display of the mobile device using an image sensor.

14. The computer-readable storage medium of claim 8, wherein the instructions further configure the computer to:
    receive a request to log out of the analytical chemistry system;
    prompt for the user's security token;
    exchange a the security token between the kiosk and the mobile device;
    log the user out of the analytical chemistry system; and update the audit record to include a logout action that
includes the identity of the user.

15. A computing apparatus comprising:

a processor; and a memory storing instructions that, when executed by the processor, configure the apparatus to:

receive, at a kiosk associated with an analytical chemistry system, a request to access the analytical chemistry system on behalf of a user, the analytical chemistry system comprising an instrument configured to perform one or more of liquid chromatography or mass spectrometry, wherein the analytical chemistry system is associated with an audit record storing information about an analytical workflow for processing a sample by the analytical chemistry system;

prompt for the user to transmit a security token to the kiosk;

exchange the security token between the kiosk and a mobile device associated with the user via a short-range communication;

verify a validity of the security token;

permit access to the analytical chemistry system based on the authenticating; and update the audit record to include a login action that includes an identity of the user.

16. The computing apparatus of claim 15, wherein the audit record is a record in an audit trail that complies with a regulatory or scientific standard.

17. The computing apparatus of claim 15, wherein the security token is provided to the mobile device in response to the user successfully log into a credentialing application on the mobile device.

18. The computing apparatus of claim 15, wherein the security token is a data structure and the short range communication comprises receive a contactless transmission of the data structure from the mobile device.

19. The computing apparatus of claim 15, wherein the security token is a visible code and the short-range communication comprises scan the visible code from a display of the mobile device using an image sensor.

20. The computing apparatus of claim 15, wherein the instructions further configure the apparatus to:

receive a request to log out of the analytical chemistry system;

prompt for the user's security token;

exchange a the security token between the kiosk and the mobile device;

log the user out of the analytical chemistry system; and update the audit record to include a logout action that includes the identity of the user.

* * * * *